United States Patent Office 3,219,704
Patented Nov. 23, 1965

3,219,704
MANUFACTURE OF AROMATIC AMINES
FROM ALICYCLIC KETONES
Gene R. Wilder, St. Albans, and James E. Van Verth, Huntington, W. Va., assignors to Monsanto Company, a corporation of Delaware
No Drawing. Filed Feb. 2, 1961, Ser. No. 86,585
14 Claims. (Cl. 260—576)

This invention relates to manufacture of amines from alicyclic ketones. Condensation of alicyclic ketones and ammonia compounds according to this invention produces N-alicyclic amines or diarylamines or admixtures thereof depending upon the ammonia compound and conditions of reaction. One embodiment of this invention relates to a method of introducing an aromatic radical into aromatic amine employing as the source of the aromatic radical, an alicyclic ketone. A more specific embodiment of the invention relates to a method of producing diarylamines from monoarylamines. In general, the invention relates to methods of making compositions containing a product in which an aromatic or alicyclic radical is linked to nitrogen by a single bond employing alicyclic ketone as source of the aromatic or alicyclic radical.

According to the present invention a monovalent radical from an alicyclic ketone replaces hydrogen on nitrogen of ammonia or an amine by reaction or series of reactions involving transfer of hydrogen. The precursors or intermediates are probably similar to those formed during reductive alkylation with alicyclic ketones. These precursors are relatively unstable substances often undistillable and easily hydrolyzed. Hydrogenation thereof is well known but in contrast to former reactions hydrogen involved in transfer here comes from the reactants, ketone and ammonia compound. Dehydrogenation normally requires temperatures above the decomposition point of simple amine-ketone condensation products such as anils. Surprisingly, it was found that at low hydrogen concentration dehydrogenation took place smoothly. In other words, the temperature required for dehydrogenation was below decomposition temperature.

Fundamentally, the process involves heating below decomposition temperature six-membered alicyclic ketone and ammonia compound having not more than two hydrogens of NH₃ replaced

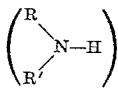

with dehydrogenation catalyst. Where only one hydrogen is available the process undoubtedly involves preliminary formation of the enamine. Where more than one hydrogen is available the cycloalkylideneamine probably forms followed by reduction and aromatization both resulting from hydrogen transfer reactions. Indeed, it is feasible and sometimes preferable to form cyclohexylideneamine as a preliminary step and then carry out an aromatization reaction. It will be understood that cycloalkylideneamine is essentially equivalent to primary amine and ketone. In either case, reduced product forms without significant breaking of carbon-carbon bonds. The net result of the reaction is that at least part of the alicyclic ketone or cycloalkylidene radical is converted to monovalent radical attached to nitrogen. The over-all process involves a complicated series of reactions and the invention is not limited to any theory or opinion as to the mechanism by which useful results are obtained.

The process requires alicyclic ketones containing six ring carbon atoms but substituents may be present in this ring and condensed rings are suitable. Examples comprise cyclohexanone, 2-methylcyclohexanone, 3-methylcyclohexanone, 4-methylcyclohexanone, 3,4-dimethylcyclohexanone, 2,5-dimethylcyclohexanone, 4-ethylcyclohexanone, 4-propylcyclohexanone, 4-isopropylcyclohexanone, 4-butylcyclohexanone, 4-tert.-butylcyclohexanone, 2-ethylcyclohexanone, alpha-tetralone, beta-tetralone and 2-propylcyclohexanone. Unsaturated ketones are also useful as for example carvenone, menthone and 3,5-dimethyl-2-cyclohexen-1-one. Ketones containing a quaternary carbon in the ring react poorly in the present process.

When the amine reactant is primary, either aliphatic or aromatic, the products comprise secondary amines. Alkyl primary amines and cyclohexylamine are suitable reactants. Alkyl amines include methylamine, ethylamine, propylamine, isopropylamine, butylamine, sec.-butylamine, tert.-butylamine, amylamine, 2-ethylhexylamine, octylamine, tert.-octylamine, sec.-octylamine, decylamine and hexadecylamine. These illustrate alkyl of 1 to 16 carbon atoms. Primary aromatic amines are useful for preparing secondary aromatic amines. By way of illustration there may be mentioned aniline, p-toluidine, o-toluidine, m-toluidine, p-butylaniline, p-decylaniline, p-dodecylaniline, alpha-naphthylamine, beta-naphthylamine, 2,3-xylidine, mesidine, 2-furanamine, xenylamine, p-phenetidine, p-anisidine, p-butoxyaniline, 3,4-dimethoxyaniline, p-ethylaniline, p-phenoxyaniline, p-cyclohexylaniline and p-benzylaniline. While sterically hindered anilines as for example, 2,6-dimethylaniline and mesidine react slowly they undergo the desired condensation. Aromatic primary amines containing in the nucleus alkylamino substituents sometimes undergo side reactions with cleavage of the alkyl group at temperatures high enough to evolve hydrogen. However, at lower temperatures they readily undergo hydrogen transfer reaction without significant cleavage to produce aromatized product in admixture with the corresponding N-alicyclic amine. Thus, mixtures of products form readily from N-cyclohexyl-p-phenylenediamine, N-methyl-p-phenylenediamine, N-propyl-p-phenylenediamine, N-isopropyl-p-phenylenediamine, N-butyl-p-phenylenediamine, N-tert.-butyl-p-phenylenediamine, N-hexyl, N-octyl, N-nonyl, N-decyl, N-dodecyl, N-tridecyl, N-tetradecyl, N-pentadecyl and N-hexadecyl-p-phenylenediamines and from p-aminodiphenylamine. Primary amino groups react faster than secondary amino groups so that by proper choice of reaction conditions considerable selectivity can be achieved. On the other hand, secondary amines can be converted to tertiary amines under more severe conditions. Examples of suitable secondary amines are diphenylamine, N-methylaniline, N-ethylaniline, N-propylaniline, N-isopropylaniline, N-butylaniline, N-tert.-butylaniline, N-octylaniline, N-sec.-octylaniline, N-tert.-octylaniline, phenyl-beta-naphthylamine and N-cyclohexylaniline. N-alkylanilines form by condensing alkylamines with cyclohexanone in the presence of dehydrogenation catalyst.

Many dehydrogenation catalysts are known and a variety are commercially available. In general, hydrogenation catalysts also function as dehydrogenation catalysts. Examples of dehydrogenation catalysts are rhodium, duthenium, platinum, palladium, Raney nickel, Raney cobalt, copper chromite, iridium, osmium, oxides of chromium and oxides of molybdenum. For the purposes of the present invention the platinum metals are particularly useful and are preferred. It will be appreciated, however, that other dehydrogenation catalysts are contemplated and the desired products have been prepared from reactions with other catalyst systems. Desirably, metal catalysts are supported on charcoal, asbestos, alumina, pumice, kieselguhr, silica gel or barium sulfate. Non-metal catalysts are illustrated by activated charcoal, activated alumina, silica gel and magnesite. Amounts as low as 1% of 5% palladium on carbon give satisfactory results. The amount of catalyst, expressed as percent by weight of the final product expected from the reaction assuming theoretical yield, will depend upon the reaction rate required. Amounts within the range of 1%–20% effectively catalyze the reactions although amounts outside this range may be used. The reactions may be effected in the presence of elemental hydrogen providing the hydrogen concentration is not so high as to make hydrogenation predominate over dehydrogenation. The presence of hydrogen gas sometimes mitigates catalyst poisoning.

The temperature and time of heating will vary depending upon the reactants selected, the conditions of heating and the results desired. While heating will usually be within the range of 225–275° C. where hydrogen is to be evolved and 150–210° C. where no hydrogen is evolved, these are not the absolute operating limits. The reactions sometimes go at 150° C. or even lower temperatures and may be conducted at temperatures above 300° C. below decomposition temperature. In general, reactions are carried out below about 350° C. At higher temperatures cyclization to nitrogen heterocyclic may be promoted whereby the cyclo alkylidene radical is converted to divalent aromatic radical. Where amine and ketone per se are charged initially it is feasible to remove water from the reaction mixture during heating with the catalyst. This may be accomplished by azeotropic distillation employing any of the well-known azeotroping agents. Solvents and mixtures of solvents may be present in the reaction medium as for example benzene, toluene, cymene, and excess of the cyclic ketone. However, neither azeotroping agent nor other solvent is necessary. Many antioxidants for gasoline, natural and synthetic rubber and other oxidizable substances may be produced by the method of this invention. Mixtures of products are often directly utilizable for this purpose.

The following examples illustrate the invention in further detail.

*Example 1*

There was charged to a reactor fitted with a water trap, condenser and stirrer, 13.7 grams (0.10 mole) of p-phenetidine, 10 grams (0.10 mole) of cyclohexanone, 3 grams of 5% palladium on carbon and 65 ml. of toluene. The system was heated under nitrogen while water collected in the trap. Hydrogen evolution began at 115–120° C. During the reaction the liquid reaction mixture was stirred vigorously and a slow stream of nitrogen kept flowing through the vapor space above the liquid to sweep out hydrogen. The temperature was raised to 165–180° C. by distilling off some toluene. After a total heating time of 3 hours the temperature was raised to 245–255° C. at which temperature hydrogen evolution was very rapid. Heating was continued for about 30 minutes after evolution of gas ceased and the reaction mixture was then cooled to 120° C., filtered and the filtered catalyst washed with a little toluene. The filtrate crystallized upon further cooling. The crystals were separated by filtration, washed with heptane and dried to obtain 7.6 grams of p-ethoxydiphenylamine. After recrystallizing from hexane it melted at 69–71° C.

*Example 2*

One molecular proportion each of cyclohexanone and ammonia in the form of concentrated ammonium hydroxide was charged to an autoclave together with 5% palladium on carbon. The catalyst was approximately 5% of the weight of the cyclohexanone. This reaction mixture was heated six hours at 160° C., then cooled and filtered. The amines were extracted from the aqueous mixture with hydrochloric acid, liberated by neutralization of the acid solution and subjected to gas liquid partition chromatography. Aniline in approximately 30% yield formed together with N-cyclohexylaniline, dicyclohexylamine and phenol.

*Example 3*

A mixture of 24 grams of N-cyclohexylideneaniline and 2 grams of palladium catalyst (5% palladium supported on carbon) was heated and stirred for about an hour at 210–220° C. The catalyst was then removed by filtration and the product recovered in essentially quantitative yield. It was identified as a mixture of about 35% diphenylamine and about 65% N-cyclohexylaniline.

The table below records yields of diphenylamine and N-cyclohexylaniline obtained by heating N-cyclohexylideneaniline with various catalysts for the times and temperatures indicated. Most of the runs were made by heating 17.3 grams of the anil and 2 grams of catalyst. The catalyst was removed and the residue analyzed by gas liquid partition chromatography. In most cases the quantity of anil remaining unchanged was nil. Those runs in which unchanged anil was present are marked by an asterisk in the yield column for N-cyclohexylaniline. Small amounts of carbazole were sometimes present. In the runs marked by an asterisk in the time column a nitrogen purge was used as described in Example 1. Dehydrogenation occurs more readily with platinum than with palladium at the lower temperatures but the advantage of more severe conditions is limited by losses presumably due to hydrogenolysis. Lowering the palladium charge and using a nitrogen purge reduce hydrogenolysis. When the heating was conducted without catalyst for 4 hours at 260° C., the product contained approximately 60% unchanged anil but only 8–10% anil remained after heating with activated charcoal.

| Catalyst | Charge of Catalyst, Percent of N-Cyclohexylideneaniline | Time, Hours | Temp., ° C. ±5° | Yield, Mole Percent of N-Cyclohexylideneaniline | |
|---|---|---|---|---|---|
| | | | | Diphenylamine | N-Cyclohexylaniline |
| Sponge Nickel | 12 | 2 | 230 | 11 | *18 |
| Ni on kieselguhr | 12 | 7 | 250–290 | 36 | 16 |
| 5% Rh on C | 12 | 2 | 230 | 34 | 68 |
| 5% Ir on C | 12 | 2 | 230 | 1 | *28 |
| 5% Pt on C | 12 | 3 | 173 | 33 | 65 |
| 5% Pt on C | 12 | 2 | 200 | 33 | 63 |
| 5% Pt on C | 12 | *0.5 | 230 | 26 | *38 |
| 5% Pt on C | 12 | 2 | 230 | 51 | 14 |
| 5% Pd on CaCO₃ | 12 | 2 | 230 | 37 | 62 |
| 5% Pd on C | 12 | 2 | 230 | 29 | 45 |
| 5% Pd on C | 12 | 4 | 260 | 70 | 2 |
| 5% Pd on C | 6 | 4 | 260 | 71 | 10 |
| 5% Pd on C | 6 | *4 | 260 | 83 | 4 |
| 5% Pd on C | 3 | *4¼ | 260 | 82 | 8 |
| Activated carbon (Nuchar CN) | 12 | *4 | 260 | 0.5 | *26 |
| None | 0 | *4 | 260 | trace | *1–2 |

*Example 4*

To a reaction vessel was charged 38 grams (0.2 mole) of N-cyclohexyl-p-phenylenediamine, 100 grams (1.0 mole) of cyclohexanone and 5 grams of 5% palladium supported on carbon. The mixture was heated for about an hour at 169–200° C. to produce N-cyclohexyl-N'-phenyl-p-phenylenediamine and N,N'-dicyclohexyl-p-phenylenediamine in a molar ratio of approximately 1 to 2.

*Example 5*

To a glass reaction vessel was charged 92.1 grams (0.4 molecular proportion) of N-cyclohexylidene-N'-isopropyl-p-phenylenediamine and 2.3 grams of 5% palladium supported on carbon. This charge was heated to 224° C. over a period of 248 minutes. The catalyst was separated and 90 grams of product recovered. This product contained 22.1% N-isopropyl-N'-phenyl-p-phenylenediamine and 19.4% N-isopropyl-N'-cyclohexyl-p-phenylenediamine. These products formed in approximately the same ratio by heating 60.5 grams of the aforesaid anil with 1.2 grams of 5% palladium supported on carbon for 480 minutes during which the pot temperature was increased from 120 to 225° C. Increasing the temperature to 252° C. did not change the N-isopropyl-N'-phenyl-p-phenylenediamine content significantly but lowered the N-isopropyl-N'-cyclohexyl-p-phenylenediamine to 8.0%. Heating the same charge 370 minutes at 120–185° C. produced a product containing 29% N-isopropyl-N'-phenyl-p-phenylenediamine, 47% N-isopropyl-N'-cyclohexyl-p-phenylenediamine and 2% unchanged anil. About 46% of the anil remained unchanged after 27 minutes at 120–165.5° C. but had dropped to 2% after 147 minutes.

*Example 6*

A mixture of 0.103 gram mole of N-methylaniline and 50 ml. of cyclohexanone was heated with 1.5 grams of palladium on carbon catalyst. Cyclohexanone and by-product water were distilled off to bring the temperature to 260° C. Heating was continued for 3 hours during which time by-product hydrogen was evolved. The product contained N-methyldiphenylamine in 47% yield.

*Example 7*

Equal molar proportions of diphenylamine and cyclohexanone were heated with palladium supported on carbon. About half the cyclohexanone was allowed to distill out and the temperature reached 250° C. within 2 hours. Small amounts of distillate were removed occasionally and these were replaced by fresh quantities of cyclohexanone while heating at 248–262° C. for an additional 4½ hours, hydrogen being evolved in the process. Based on the diphenylamine charged, about 14% yield of triphenylamine formed.

It is intended to cover all changes and modifications of the examples of the invention herein chosen for purposes of disclosure which do not constitute departures from the spirit and scope of the invention.

What is claimed is:

1. The process which consists essentially of heating below about 350° C. six-membered alicyclic hydrocarbon monoketone of less than 11 carbon atoms, each ring carbon except the one attached to oxygen being attached to at least one hydrogen, and ammonia compound of the group consisting of ammonia, primary amines, and secondary amines, the molar portion of the ketone being at least substantially equal to the ammonia compound with dehydrogenation catalyst thereby converting alicyclic ketone to monovalent carbocyclic radical of the same number of carbon atoms replacing the hydrogen of the ammonia compound.

2. The process which consists essentially of heating below about 350° C. six-membered alicyclic hydrocarbon monoketone of less than 11 carbon atoms each ring carbon of which except for the one attached to oxygen is attached to at least one hydrogen and nuclear saturated hydrocarbon substituted aniline of 1–12 carbon atoms in said hydrocarbon containing less than four such substituents, the molar proportion of ketone being at least substantially equal to that of the primary amine, with a platinum metal catalyst thereby converting at least part of the alicyclic ketone to monovalent carbocyclic radical of the same number of carbon atoms replacing hydrogen of the primary amine.

3. The process of making diarylamines which consists essentially of heating below about 350° C. cyclohexanone and nuclear saturated hydrocarbon substituted aniline of 1–12 carbon atoms in said hydrocarbon there being less than four such substituents with a platinum metal catalyst, the molar proportion of cyclohexanone being at least equal to that of the amine and isolating diaryl amine.

4. The process of making diarylamines which consists essentially of heating below about 350° C. cyclohexanone and nuclear-substituted alkylaniline containing not more than 12 carbon atoms in the said alkyl, less than four alkyl substituents being present with a palladium catalyst supported on carbon, the molar proportion of cyclohexanone being at least equal to that of the amine, said heating being sufficient to form by-product hydrogen, and isolating diarylamine.

5. The process of making lower p-alkoxydiphenylamines which consists essentially of heating below about 300° C. substantially equal molar proportions of cyclohexanone and lower p-alkoxyaniline with palladium catalyst, said heating being sufficient to form by-product hydrogen and isolating lower p-alkoxydiphenylamine.

6. The process of making diphenylamine which consists essentially of heating N-cyclohexylideneaniline below about 300° C. with palladium catalyst, said heating being sufficient to form by-product hydrogen and isolating diphenylamine.

7. The process of making diphenylamine which consists essentially of heating equal molar proportions of cyclohexanone and aniline below about 300° C. with palladium catalyst, said heating being sufficient to form by-product hydrogen and isolating diphenylamine.

8. The process which consists essentially of heating N-cyclohexylideneaniline below about 300° C. with palladium catalyst thereby forming a product containing diphenylamine.

9. The process which consists essentially of heating N-cyclohexylidene-N'-isopropyl-p-phenylenediamine with palladium catalyst at 150–225° C. thereby forming a product containing N-isopropyl-N'-phenyl-p-phenylenediamine.

10. The process which consists essentially of heating

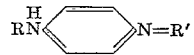

where R is an alkyl radical of 1–16 carbon atoms and R' is a six-membered cycloalkylidene radical of less than 11 carbon atoms each ring carbon of which, except for the one attached to nitrogen, is attached to at least one hydrogen, with palladium catalyst below about 300° C. thereby converting cycloalkylidene to monovalent carbocyclic radicals of the same number of carbon atoms.

11. The process which consists essentially of heating

where R is the phenyl radical and R' is a six-membered cycloalkylidene radical of less than 11 carbon atoms each ring carbon of which, except for the one attached to nitrogen is attached to at least one hydrogen, with palladium catalyst below about 300° C. thereby converting cycloalkylidene to monovalent carbocyclic radicals of the same number of carbon atoms.

12. The process which consists essentially of heating

where R is the cyclohexyl radical and R' is a six-membered cycloalkylidene radical of less than 11 carbon atoms each ring carbon of which, except for the one attached to nitrogen, is attached to at least one hydrogen, with palladium catalyst below about 300° C. thereby converting cycloalkylidene to monovalent carbocyclic radicals of the same number of carbon atoms.

13. The process which consists essentially of heating one molar proportion of

where R is alkyl of 1–16 carbon atoms and at least one molar proportion of six-membered alicyclic hydrocarbon monoketone of less than 11 carbon atoms each ring carbon of which, except for the one attached to nitrogen, is attached to at least one hydrogen, with palladium catalyst below about 300° C. thereby converting alicyclic ketone to monovalent carbocyclic radical of the same number of carbon atoms replacing hydrogen of the primary amino group.

14. The process of making tertiary amines which consists essentially of heating N-alkylaniline of 1–8 carbon atoms in the said alkyl with at least an equal molar proportion of six-membered alicyclic hydrocarbon monoketone of less than 11 carbon atoms each ring carbon of which, except for the one attached to nitrogen, is attached to at least one hydrogen, with palladium catalyst below about 300° C. and isolating tertiary amine.

References Cited by the Examiner

UNITED STATES PATENTS 2,393,889 1/1946 Cook et al. _____ 260—576
2,413,598 12/1946 Ballard et al. _____ 260—578 X CHARLES B. PARKER, *Primary Examiner.*